US011907705B1

(12) United States Patent
Zafar et al.

(10) Patent No.: US 11,907,705 B1
(45) Date of Patent: *Feb. 20, 2024

(54) SYSTEMS AND METHODS FOR GENERATING DYNAMICALLY UPDATED METADATA USING REAL-TIME ARTIFICIAL INTELLIGENCE MODELS

(71) Applicant: Winchester Global Trust Company Limited, Hamilton (BM)

(72) Inventors: Fawad Zafar, London (GB); Michael Joseph Karlin, Bethesda, MD (US)

(73) Assignee: Winchester Global Trust Company Limited, Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 18/494,291

(22) Filed: Oct. 25, 2023

Related U.S. Application Data (63) Continuation of application No. 18/203,240, filed on May 30, 2023, now Pat. No. 11,816,474.

(51) Int. Cl.
*G06F 8/65* (2018.01)
(52) U.S. Cl.
CPC .................................... *G06F 8/65* (2013.01)

(58) Field of Classification Search
USPC ....................................................... 717/168
See application file for complete search history.

(56) References Cited

U.S. PATENT DOCUMENTS

| | | | |
|---|---|---|---|
| 11,307,840 B2* | 4/2022 | Delgado Campos | G06F 8/65 |
| 11,483,630 B1* | 10/2022 | Panchaksharaiah | G06F 16/735 |
| 11,526,912 B2* | 12/2022 | Garthwaite | G06F 16/908 |
| 2012/0230552 A1* | 9/2012 | Canora | G06F 16/907 382/115 |
| 2018/0089591 A1* | 3/2018 | Zeiler | G06F 3/048 |
| 2022/0138245 A1* | 5/2022 | Guimaraes | G06N 7/01 707/739 |

* cited by examiner

*Primary Examiner* — Qing Chen
*Assistant Examiner* — Clint Thatcher
(74) *Attorney, Agent, or Firm* — Perkins Coie LLP (57) ABSTRACT

Systems and methods for generating dynamically updated metadata using real-time artificial intelligence models. For example, the system may receive a first metadata tag requirement for first metadata of a first media asset. The system may determine a first metadata field for the first metadata based on the first metadata tag requirement. The system may determine a first content population function for the first metadata field. The system may generate the first metadata with the first content population function. The system may generate the first media asset with the first metadata.

20 Claims, 6 Drawing Sheets

```
<?php
// Set variables based on page content or database data
$page_title = "Dynamic Page Title";
$page_description = "This is a dynamically generated meta description.";
$page_keywords = "dynamic, meta tags, PHP";
// Output the dynamic meta tags in the HTML head section
echo '<meta name="title" content="'.$page_title.'">';
echo '<meta name="description" content="'.$page_description.'">';
echo '<meta name="keywords" content="'.$page_keywords.'">';
?>
```

250

```
<!DOCTYPE html>
<html>
<head>
  <meta name="description" content="Default meta description">
  <script>
    // Wait for the page to finish loading
    window.onload = function() {

// Get a reference to the meta tag
      var metaDescription = document.querySelector('meta[name="description"]');

// Update the content of the meta tag
      metaDescription.setAttribute('content', 'New meta description');
    }
  </script>
</head>
<body>
  <h1>Hello, world!</h1>
</body>
</html>
```

SYSTEMS AND METHODS FOR GENERATING DYNAMICALLY UPDATED METADATA USING REAL-TIME ARTIFICIAL INTELLIGENCE MODELS

CROSS-REFERENCE TO RELATED APPLICATION(S)

This application is a continuation of U.S. patent application Ser. No. 18/203,240, filed May 30, 2023. The content of the foregoing application is incorporated herein in its entirety by reference.

BACKGROUND

Digital media refers to any content or information that is created, distributed, and consumed using digital technologies. It encompasses various forms of media, such as text, images, audio, video, and interactive elements, which are produced and accessed through digital devices and platforms. In many ways, digital media has revolutionized the way content is created, shared, and/or consumed. It has significantly impacted industries such as entertainment, news and journalism, advertising, marketing, education, and communication. With the advent of the internet and the proliferation of digital devices like smartphones, tablets, and computers, digital media has become an integral part of our daily lives.

While digital media offers numerous benefits, it also creates novel technical challenges and problems. For example, the ease of content creation and dissemination on digital platforms has led to the proliferation of misinformation, rumors, and fake news. It can be challenging for users to differentiate between reliable information and false or misleading content. Additionally, digital media often requires users to provide personal information, which raises concerns about privacy and data security. Incidents of data breaches, unauthorized access, and misuse of personal information have become increasingly common. Digital media has also made it easier to copy, distribute, and reproduce copyrighted content without proper authorization. This has led to significant challenges in protecting intellectual property rights and revenue streams for content creators.

SUMMARY

In view of the aforementioned technical challenges and problems specific to digital media, the systems and methods described herein provide for improvements to how digital media is created, shared, and/or consumed. In particular, the systems and methods described herein recite a novel metadata architecture and uses. For example, the systems and methods recite the use of generating dynamically updated metadata using real-time artificial intelligence models. The dynamically updated metadata may mitigate the novel technical challenges and problems discussed above by automatically updating itself to reflect real-time changes in the content that it describes, as well as any relationship to other content.

For example, in conventional systems, metadata for a media asset, whether public or private, is static unless it is forcefully updated or changed by a user. Because of this, metadata lacks robustness which limits its utility in learning about the quality, provenance, use, rights, etc., pertaining to its media asset. One solution to overcome this lack of robustness is to use blockchain and other ledger technologies to "bake in" these properties with digital assets, leading to a whole host of new problems and challenges that surround the use of such technologies.

In contrast to this approach, the systems and methods may use artificial intelligence models, including, but not limited to, machine learning, deep learning, etc., and specifically large language models (LLMs) to dynamically update metadata in real time by continuously mining public data from one or more databases. The updated metadata may reflect changes in the underlying media asset as well as its relationship to other media assets. For example, the metadata may provide a probability/confidence level of how accurate the metadata is, whether or not the media asset is similar to other media assets (and/or to what degree), and/or describe how (and/or by whom) the media asset has been used. Moreover, the solution overcomes the issues discussed above related to metadata and does not invoke the technical problems attributed to blockchain technology.

To achieve these technical benefits, the systems and methods describe the use of metadata that comprises a content population function within the metadata itself. The content population function, which may be powered by an artificial intelligence model, may monitor for inputs (e.g., data parsed from one or more databases) and update the content of the metadata (e.g., the descriptions of the media asset, usage information about the media asset, etc.). By doing so, the system may maintain metadata that pertains to current circumstances and/or describes relationships and/or data that may not have existed upon the creation of the metadata and/or its media asset.

In some aspects, systems and methods for generating dynamically updated metadata using real-time artificial intelligence models are described. For example, the system may receive a first metadata tag requirement for first metadata of a first media asset. The system may determine a first metadata field for the first metadata based on the first metadata tag requirement. The system may determine a first content population function for the first metadata field. The system may generate the first metadata with the first content population function. The system may generate the first media asset with the first metadata.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

Figure 1:
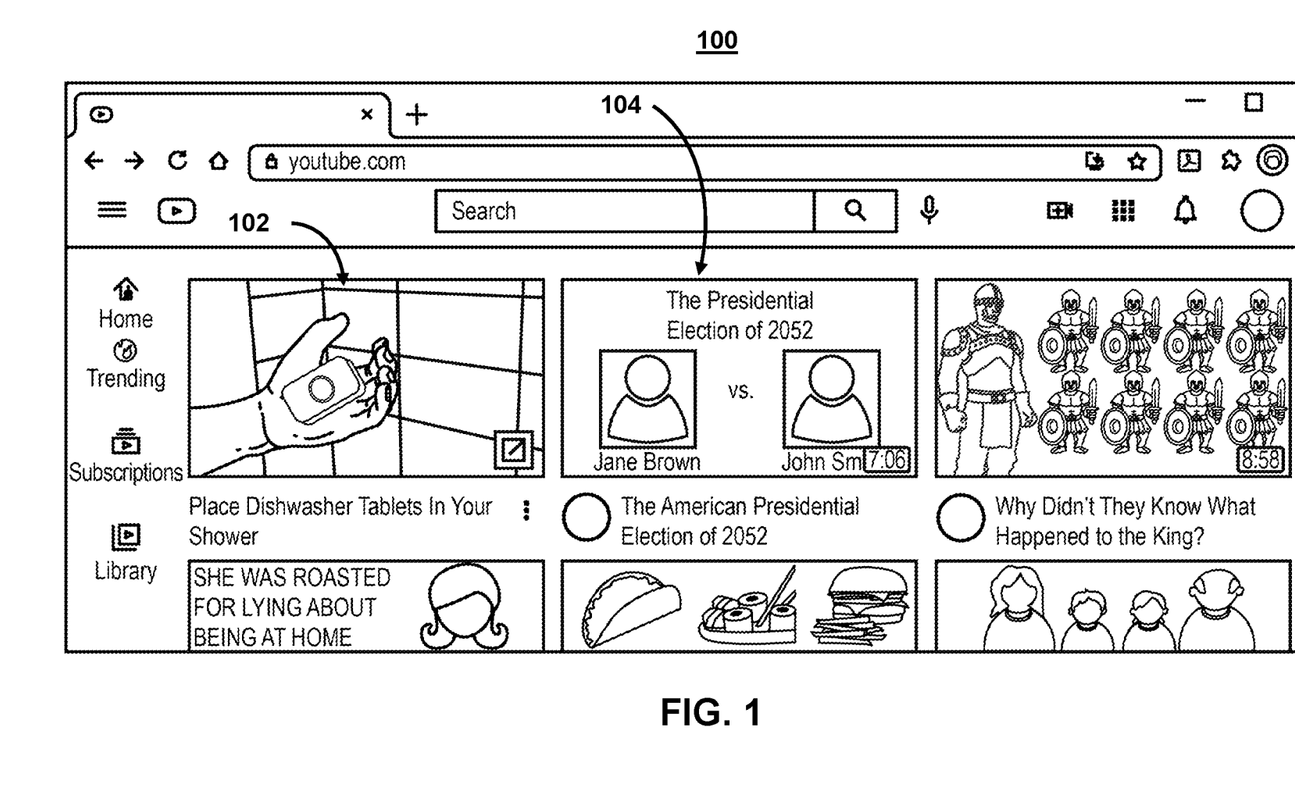
FIG. 1 shows an illustrative example of a user interface presenting a plurality of media assets, in accordance with one or more embodiments.

FIG. 1 shows an illustrative example of user interface presenting a plurality of media assets, in accordance with one or more embodiments. Systems and methods for generating dynamically updated metadata using real-time artificial intelligence models are described. For example, FIG. 1 shows user interface 100. As referred to herein, a "user interface" may comprise a human-computer interaction and communication in a device, and may include display screens, keyboards, a mouse, and the appearance of a desktop. For example, a user interface may comprise a way a user interacts with an application or a website.

User interface 100 includes media asset 102 and media asset 104. As referred to herein, "a media asset" should be understood to mean an electronically consumable content, such as internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. The media asset may comprise digital media (or digital asset) that is digitized content that can be transmitted over the internet or computer networks. The media asset may also comprise Augmented Reality (AR), Virtual Reality (VR), Mixed Reality (MR), and/or other Extended Reality (XR). A media asset may be recorded, played, displayed, or accessed by user devices, but can also be part of a live performance or other user-generated content. Furthermore, user-generated content may include content created and/or consumed by a user. For example, user-generated content may include content created by another, but consumed and/or published by the user. It should be noted that embodiments describing one type of media (e.g., video) may also be applied to other types of media (e.g., audio).

Media asset 102 and media asset 104 each may comprise metadata. For example, media asset 102 may comprise first metadata and media asset 104 may comprise second metadata. For example, metadata refers to data that provides information about other data. In some embodiments, the system may receive a first metadata tag requirement for metadata of a media asset. In some embodiments, a metadata tag requirement may indicate a purpose of the metadata tag. The purpose of the metadata tag may be to provide context, description, and/or organization to the main data it represents. For example, the metadata tag requirement may describe and identify various aspects of data, such as the title, author, date created, file format, and/or size. That is, it may provide essential information about the content and characteristics of the data.

Additionally or alternatively, the metadata tag requirement may improve the discoverability of data by enabling efficient searching and indexing. As such, it may include keywords, tags, and/or categorization, making it easier to locate and retrieve specific data within a larger collection. Additionally or alternatively, the metadata tag requirement may establish the context and/or relationships between different pieces of data. As such, it may indicate the source, location, and/or versioning information, enabling users (and/or other systems) to understand the origin and connections of the data. Additionally or alternatively, the metadata tag requirement may play a crucial role in long-term data preservation and management. As such, it may include information about data provenance, rights, access restrictions, and archival procedures, ensuring the data remains accessible, authentic, and/or usable over time. Additionally or alternatively, the metadata tag requirement may facilitate data integration by providing information about data formats, structures, and schemas. As such, it may allow disparate datasets to be combined, analyzed, and interpreted consistently, enabling interoperability between different systems and/or applications. Additionally or alternatively, the metadata tag requirement may support data quality initiatives by capturing information about data quality standards, validation rules, and data lineage. As such, it may help organizations maintain data integrity, track changes, and/or enforce data governance policies. Additionally or alternatively, the metadata tag requirement may include security-related information, such as access controls, encryption details, and data sensitivity classifications. As such, it may aid in ensuring proper security measures are applied and help protect sensitive information. Additionally or alternatively, the metadata tag requirement may enhance data understanding, accessibility, and management throughout its life cycle. As such, it may enable effective data discovery, integration, preservation, and governance, benefiting various domains like libraries, archives, databases, digital media, scientific research, and/or other domains.

The system may determine a first metadata field for the first metadata based on the first metadata tag requirement. In some embodiments, the metadata field may comprise a component or attribute of metadata, which provides descriptive information about a particular piece of data or content. Metadata fields may be used by the system to categorize, organize, and manage data in various systems, such as databases, content management systems, and digital libraries. The metadata fields may function as labels or tags that can be associated with data to provide additional context and information about that data. These fields may include various types of information. For example, the metadata fields may include descriptive fields that describe the content, including title, author, date created, subject, keywords, and/or abstract. Additionally or alternatively, the metadata fields may include structural fields that define the structure or organization of the data, such as chapters, sections, and subsections in a document. Additionally or alternatively, the metadata fields may include administrative fields that capture administrative information, such as file format, file size, permissions, access restrictions, and/or version number. Additionally or alternatively, the metadata fields may include technical fields that record technical details about the data, such as resolution, file type, encoding, color space, or software used to create or modify the content. Additionally or alternatively, the metadata fields may include rights management fields that specify copyright information, licensing terms, and/or usage restrictions.

In some embodiments, the metadata fields may be predefined and standardized to ensure consistency and interoperability across different systems and applications. The fields may enable efficient search, retrieval, and management of data by allowing users to filter and sort based on specific criteria. Metadata fields play a crucial role in organizing and making sense of large volumes of data, improving data discoverability, and facilitating effective data governance.

In some embodiments, the system may determine a visual representation of the data and apply consistent naming conventions, default values, and semantics to one or more fields in the model. These naming conventions, default values, and semantics of the one or more fields in the model may then be used by the system to generate recommendations for the application. For example, each field may correspond to a category of criteria, characteristics, and/or options. The system may use a field identifier to identify the type of criteria being entered. For example, the system may compare the field identifier to a field database (e.g., a lookup table database listing content and/or characteristics of content that correspond to the field) to identify content for a recommendation.

Each field may correspond to criteria for particular information and/or information of a particular characteristic of content. Alternatively or additionally, each field may provide a given function. This function may be a locally performed function (e.g., a function performed on a local device) or this function may be a remotely-executed function. In some embodiments, the function may include a link to additional information and/or other applications, which may be accessed and/or available locally or remotely. In some embodiments, the field may be represented by textual and/or graphical information.

In some embodiments, the system may detect information about a field of an application (e.g., metadata or other information that describes the field). For example, the information may describe a purpose, function, origin, creator, developer, a system requirement (including required formats and/or capabilities), author, recommended use, and/or approved user. The information may be expressed in a human-readable and/or computer-readable language or may not be perceivable to a user viewing user interface 100. These fields may be used by the system to match criteria and/or other information submitted by a user and/or by a content provider. For example, in some embodiments, the system may receive content and/or criteria from a plurality of users and/or providers. In some embodiments, these criteria may describe content and/or may describe processing actions related to given content. For example, a first resource provider may enter criteria about a price of content (e.g., a given digital asset) and/or may enter criteria about a first set of delivery terms for the content. A second provider may enter criteria about a second set of delivery terms for the content. A user may then enter criteria about acceptable delivery terms for the content. The system may match each of the received criteria by a field identifier for the content (e.g., a value that uniquely identifies the content and/or characteristics about the content). The system may then make a recommendation related to the content. For example, the system may recommend to the user the content with the first set of delivery terms (as these are better than the second set of delivery terms).

A field may include a field identifier and/or a field characteristic associated with a particular type of data. For example, a field characteristic may be information (e.g., ordering, heading information, titles, descriptions, ratings information, source code data (e.g., HTML, source code headers, etc.), genre or category information, subject matter information, author/actor information, logo data, or other identifiers for the content provider), media format, file type, object type, objects appearing in the content (e.g., product placements, advertisements, keywords, context), or any other suitable information used to distinguish one section from another. In some embodiments, the field characteristic may also be human-readable text. The field characteristic may be determined to be indicative of the field (or content related to the value entered in the field) being of interest to the user based on a comparison of the field characteristic and user profile data for the user. In some embodiments, the field may comprise a name for the metadata.

The system may determine a first content population function for the first metadata field. In some embodiments, the first metadata may be populated with a content population function. For example, the content population function may be a computer code function or simply referred to herein as a function that generates content. As referred to herein, the function may be a self-contained block of code that performs a specific task or a series of related tasks. The function may be designed to accept inputs, known as arguments or parameters, and produce an output or perform a specific action based on those inputs. They can be called or invoked from other parts of the program, allowing for modular and structured code organization. Functions may improve code readability, reusability, and maintainability. The functions can have different types of return values or no return value at all, depending on the programming language and the specific requirements of the function. They can also have additional behavior, such as modifying variables outside their scope or printing information to a console.

In some embodiments, the function may underlie a dynamic meta tag, which as referred to herein may be a type of meta tag that changes based on certain conditions or variables, such as the content of a web page or the search query used to find the page. Dynamic meta tags may be used by the system to provide more relevant and specific information to search engines and users. For example, a dynamic meta title tag might include the name of the specific product or service being offered on a web page, or the location of a business. The tag may help the page rank higher in search results for relevant queries and attract more targeted traffic.

The system may generate the first metadata with the first content population function. In some embodiments, the system may generate the metadata with the content population function using manual and/or automatic inputs. For example, upon identifying the specific content population function to include, the system may generate the metadata. The content itself can be created by human authors and/or generated using automated methods such as natural language processing (NLP) models like GPT-4.0.

In some embodiments, metadata can be automatically generated or suggested based on the content population function. This can be achieved using techniques such as NLP, machine learning, or keyword analysis. For example, an algorithm can analyze the content and propose that the content population function (e.g., using relevant tags or categories based on its textual content, structure, or context) generates the code for the metadata. In some embodiments, the content population function may be based on an artificial intelligence model, including, but not limited to, machine learning, deep learning, etc. (referred to collectively herein as artificial intelligence models, machine learning models, or simply models).

The system may generate the first media asset with the first metadata. In some embodiments, the system may attach the metadata with the content population function to a media asset to generate the media asset with the metadata. Once the media asset is ready, the relevant metadata is assigned to it. This can be done manually by human editors or automated through scripts or algorithms. For example, an editor might enter the metadata into a content management system (CMS) or provide it as input to an automated process.

The system may attach metadata in various ways depending on the specific context and purpose. For example, the system may embed the metadata within the media as set and/or media asset file itself. For example, in a digital photograph, metadata such as the camera make and model, date and time of capture, GPS coordinates, and other relevant details can be stored within the image file using standardized formats like EXIF (Exchangeable Image File Format). Similarly, audio and video files can include metadata such as artist name, album title, duration, and more, using formats like ID3 tags or MPEG-7. Additionally or alternatively, the system may generate file system metadata. For example, operating systems often provide a mechanism to attach metadata to files within the file system. This metadata can include attributes like file name, file size, creation and modification dates, permissions, and other file-specific details. The file system manages this metadata alongside the file itself. Additionally or alternatively, the system may generate database metadata. For example, in the context of a relational database, metadata is stored in special system tables or dictionaries. These metadata records describe the structure and characteristics of the database, including tables, columns, indexes, relationships, and constraints. Database management systems (DBMS) utilize this metadata to optimize query execution and enforce data integrity.

Additionally or alternatively, the system may generate document metadata. Document formats like Microsoft Word, PDF, or HTML often provide fields or properties where metadata can be entered manually or automatically. This metadata can include information such as document title, author, subject, keywords, creation date, and modification history. Users can typically access this metadata through the document properties or properties panel of their respective software. Additionally or alternatively, the system may generate web page metadata. For example, websites use metadata to provide additional information about web pages. One widely used standard is the meta tags within the HTML code of a web page. These tags can include metadata like page title, description, keywords, author, language, and more. Web crawlers and search engines use this metadata for indexing and displaying search results. Additionally or alternatively, the system may generate network protocol metadata. For example, some network protocols, such as HTTP, allow for attaching metadata to content during transmission. For example, HTTP headers can carry metadata about the content type, encoding, caching directives, authentication, and more. These headers are sent alongside the content itself as part of the communication between a client and server.

Figure 2:
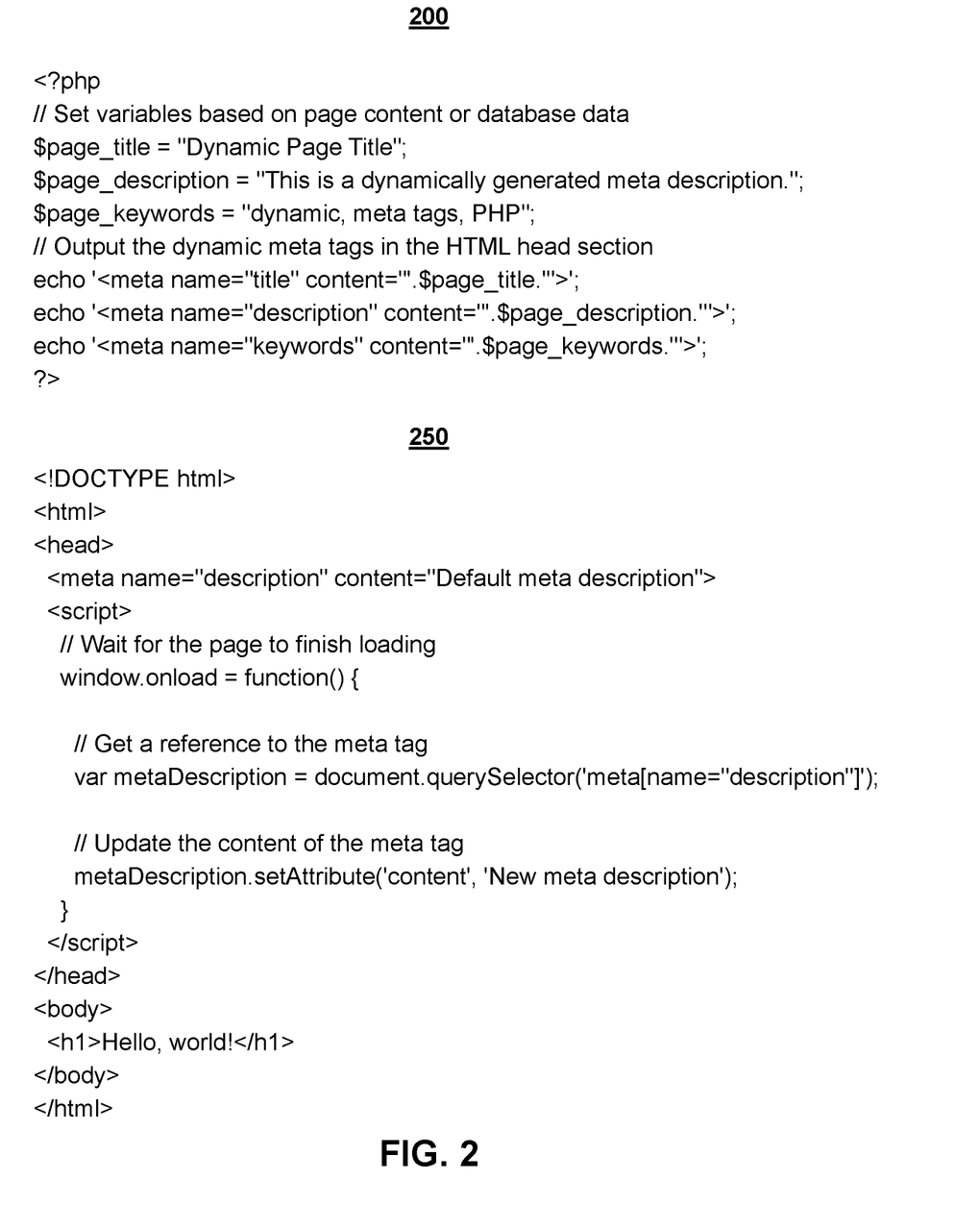
FIG. 2 shows an illustrative example of pseudocode for dynamically updated metadata, in accordance with one or more embodiments.

FIG. 2 shows an illustrative example of pseudocode for dynamically updated metadata, in accordance with one or more embodiments. For example, code 200 and/or code 250 may be used in some embodiments to generate dynamically updated metadata. That is, code 200 and/or code 250 may be used to generate a media asset with metadata that comprises a content population function (e.g., a meta tag). For example, a dynamic meta tag is a type of meta tag that changes based on certain conditions or variables, such as the content of a web page or the search query used to find the page. Dynamic meta tags may be used to provide more relevant and specific information to search engines and users. For example, a dynamic meta title tag might include the name of the specific product or service being offered on a web page, or the location of a business, which may help the page rank higher in search results for relevant queries and attract more targeted traffic.

As described herein, the system may generate dynamic meta tags that may be generated automatically by a CMS or other web development tool, based on data from the web page or database. The system may also allow meta tags to be created manually using server-side scripting languages like PHP, which can pull data from a database or other source to populate the meta tag fields. To create a dynamic meta tag, you would need to use a programming language such as JavaScript or PHP to update the content of the meta tag dynamically based on specific conditions or events. An example of a dynamic meta tag based on PHP is reflected by code 200. As shown in code 200, the system sets variables for the page title, description, and keywords based on the content of the page or data from a database. These variables are then output as meta tags in the HTML head section of the page using the echo statement.

Code 250 illustrates how a dynamic meta tag might be updated dynamically using JavaScript. For example, the HTML page of code 250 includes a default meta description in the <head> section of the page. When the page finishes loading, the JavaScript code selects the meta description tag using the document.querySelector( ) method, and then updates the content attribute of the tag using the setAttribute( ) method.

Using code 200, code 250, and/or other code, the system may automatically tag content for digital asset management using a variety of techniques (e.g., based on artificial intelligence modes, including machine learning, computer vision, deep learning, LLMs, and NLP), including NLP, which is a subfield of artificial intelligence that focuses on the interaction between computers and human language. The system may also use automatic metadata extraction, which involves extracting relevant information from file properties, such as file name, date, and file type, and/or integration with content management systems.

To perform automatic metadata extraction, the system may automatically extract metadata from digital files, such as documents, images, videos, and audio files using text analysis, which involves analyzing the content of a file to extract metadata, image analysis, which involves analyzing the visual content of an image to extract metadata, and/or audio and video analysis, which involves analyzing the audio and visual content of a file to extract metadata.

In some embodiments, code 200 and/or code 250 may be contained in a self-executing program or smart contract (e.g., on a blockchain). For example, the meta tag may perform a blockchain operation. As referred to herein, "blockchain operations" may comprise any operations including and/or related to blockchains and blockchain technology. For example, blockchain operations may include conducting transactions, querying a distributed ledger, generating additional blocks for a blockchain, transmitting communications-related non-fungible tokens, performing encryption/decryption, exchanging public/private keys, and/or other operations related to blockchains and blockchain technology. In some embodiments, a blockchain operation may comprise the creation, modification, detection, and/or execution of a smart contract or program stored on a blockchain. For example, a smart contract may comprise a program stored on a blockchain that is executed (e.g., automatically, without any intermediary's involvement or time loss) when one or more predetermined conditions are met. In some embodiments, a blockchain operation may comprise the creation, modification, exchange, and/or review of a token (e.g., a digital blockchain-specific asset), including a non-fungible token. A non-fungible token may comprise a token that is associated with a good, a service, a smart contract, and/or other content that may be verified by, and stored using, blockchain technology.

Figure 3:
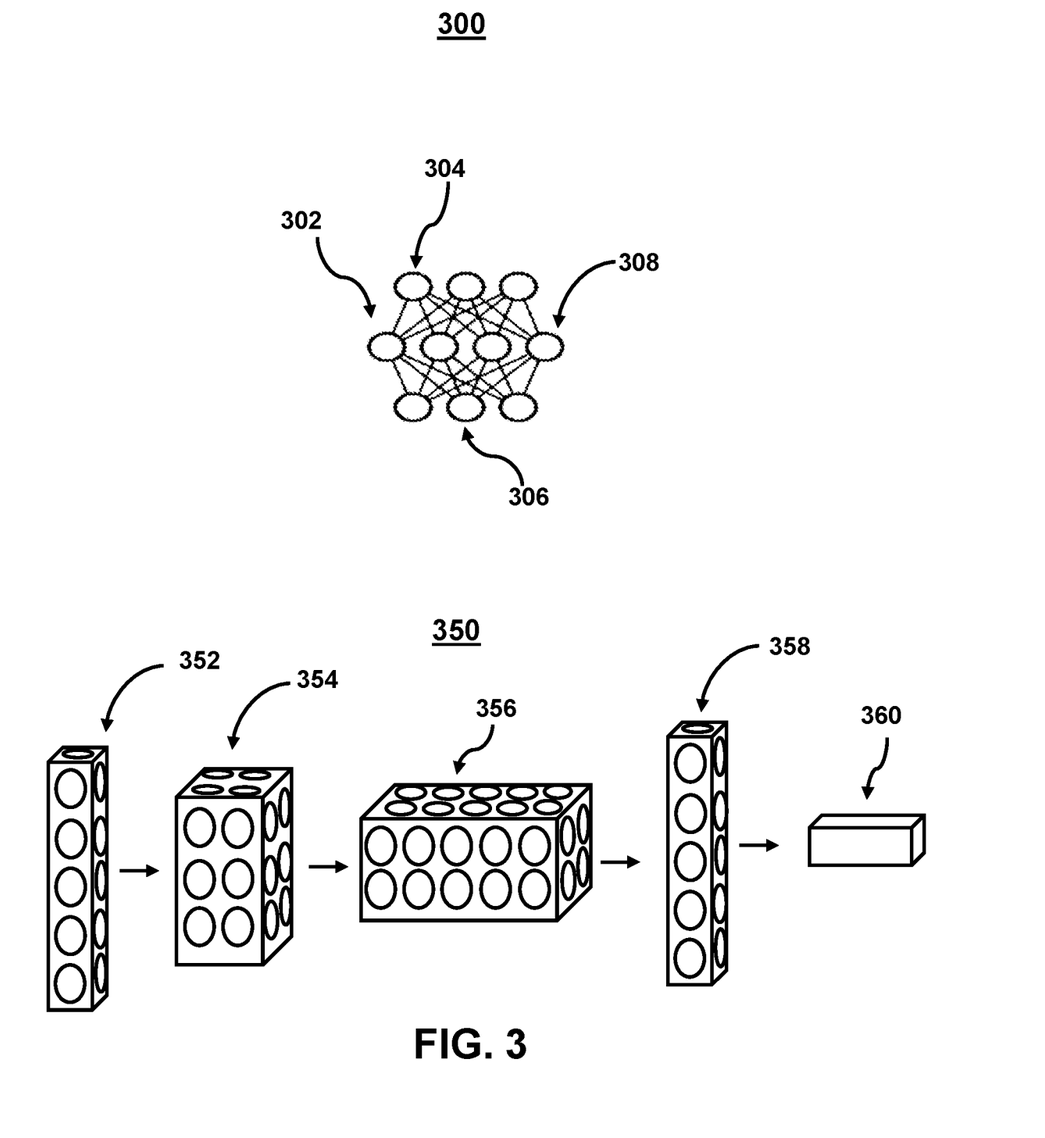
FIG. 3 shows a machine learning model architecture for facilitating dynamically updated metadata, in accordance with one or more embodiments.

FIG. 3 shows an artificial intelligence model architecture for facilitating dynamically updated metadata, in accordance with one or more embodiments. For example, the system may include one or more artificial intelligence models, architectures, and/or data preparation steps to generate meta tags. The system may determine which artificial intelligence model to use for one or more determinations (e.g., how to tag content, how to tag a media asset, how to interpret user-selected criteria, how to tag a metadata requirement, and/or how to interpret other criteria) used to generate determinations and/or generate metadata herein. The system may select the artificial intelligence model (e.g., from the plurality of artificial intelligence models) that is best suited for providing the most accurate result. For example, the system may select from various ensemble architectures featuring one or more models that are trained (e.g., in parallel) to provide the most accurate result.

Model 300 illustrates an artificial neural network. Model 300 includes input level 302. Input level 302 may receive data related to a known metadata tag requirement, metadata field, content population function, etc. Model 300 also includes one or more hidden layers (e.g., hidden layer 304 and hidden layer 306). Model 300 may be based on a large collection of neural units (or artificial neurons). Model 300 loosely mimics the manner in which a biological brain works (e.g., via large clusters of biological neurons connected by axons). Each neural unit of a model 300 may be connected with many other neural units of model 300. Such connections can be enforcing or inhibitory in their effect on the activation state of connected neural units. In some embodiments, each individual neural unit may have a summation function that combines the values of all of its inputs together. In some embodiments, each connection (or the neural unit itself) may have a threshold function such that the signal must surpass before it propagates to other neural units. Model 300 may be self-learning and trained, rather than explicitly programmed, and can perform significantly better in certain areas of problem solving, as compared to traditional computer programs. During training, output layer 308 may correspond to a classification of model 300 (e.g., contacts awaiting assignment to an agent, etc.) and an input known to correspond to that classification may be input into input level 302. In some embodiments, model 300 may include multiple layers (e.g., where a signal path traverses from front layers to back layers). In some embodiments, back propagation techniques may be utilized by model 300 where forward stimulation is used to reset weights on the "front" neural units. In some embodiments, stimulation and inhibition for model 300 may be more free-flowing, with connections interacting in a more chaotic and complex fashion. Model 300 also includes output layer 308. During testing, output layer 308 may indicate whether or not a given input corresponds to a classification of model 300 (e.g., a known metadata tag requirement, metadata field, content population function, etc.).

FIG. 3 also includes model 350, which is a convolutional neural network. The convolutional neural network is an artificial neural network that features one or more convolutional layers. Convolutional layers extract features from an input. Convolution preserves the relationship between the inputted data by learning features using partitions of the input data. As shown in model 350, input layer 352 may proceed to convolution blocks 354 and 356 before being output to convolutional output 360. In some embodiments, model 350 may itself serve as an input to model 300.

In some embodiments, model 350 may implement an inverted residual structure where the input and output of a residual block (e.g., block 354) are thin bottleneck layers. A residual layer may feed into the next layer and directly into layers that are one or more layers downstream. A bottleneck layer (e.g., block 358) is a layer that contains few neural units compared to the previous layers. Model 350 may use a bottleneck layer to obtain a representation of the input with reduced dimensionality. An example of this is the use of autoencoders with bottleneck layers for nonlinear dimensionality reduction. Additionally, model 350 may remove non-linearities in a narrow layer (e.g., block 358) in order to maintain representational power. In some embodiments, the design of model 350 may also be guided by the metric of computation complexity (e.g., the number of floating point operations). In some embodiments, model 350 may increase the feature map dimension at all units to involve as many locations as possible instead of sharply increasing the feature map dimensions at neural units that perform downsampling. In some embodiments, model 350 may decrease the depth and increase width of residual layers in the downstream direction.

Figure 4:
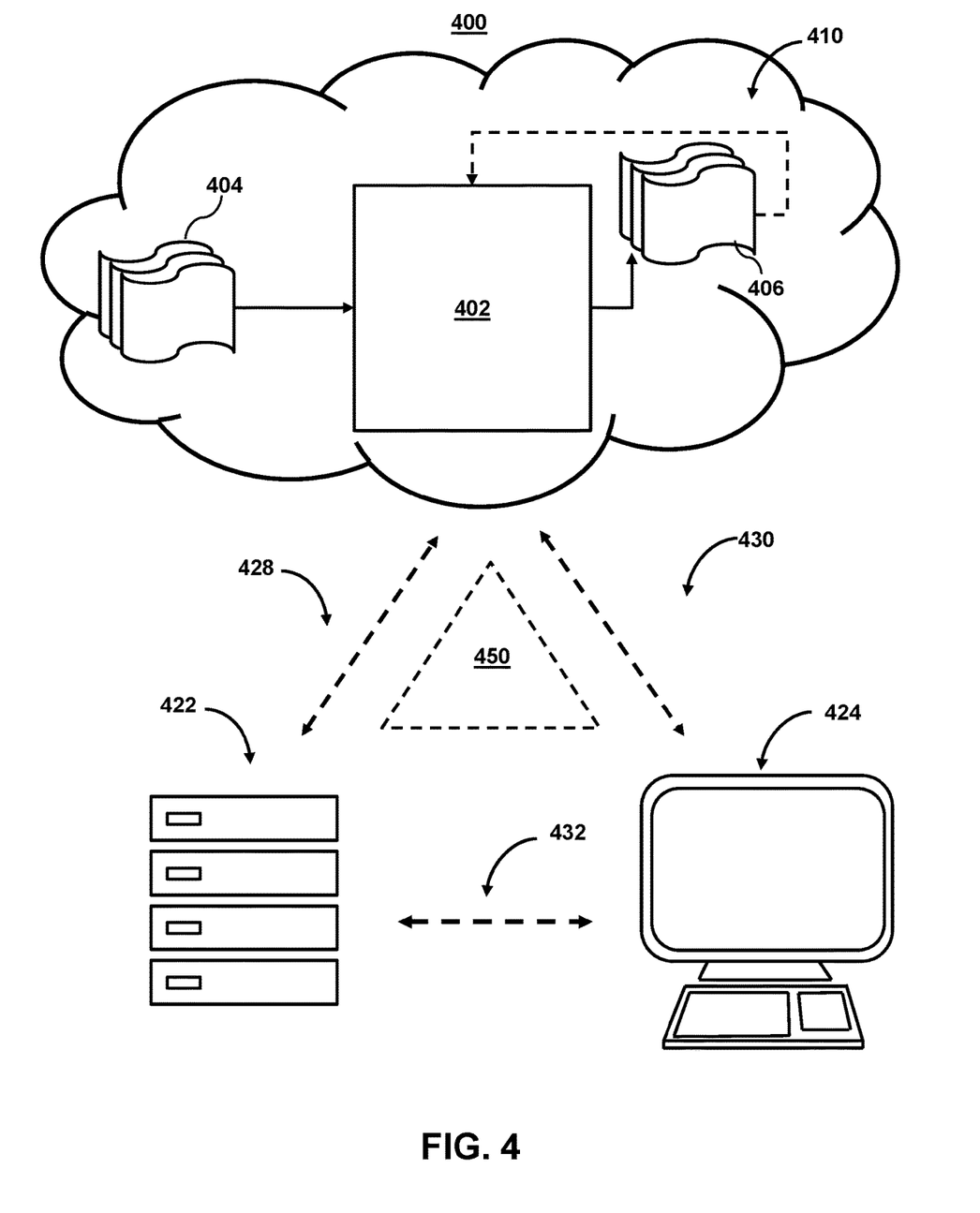
FIG. 4 shows a system for facilitating dynamically updated metadata, in accordance with one or more embodiments.

FIG. 4 shows a system for facilitating dynamically updated metadata, in accordance with one or more embodiments. As shown in FIG. 4, system 400 may include server 422 and user terminal 424 (which in some embodiments may correspond to a personal computer). While shown as a server and personal computer, respectively, in FIG. 4, it should be noted that server 422 and user terminal 424 may be any computing device, including, but not limited to, a laptop computer, a tablet computer, a hand-held computer, other computer equipment (e.g., a server), including "smart," wireless, wearable, and/or mobile devices. FIG. 4 also includes cloud components 410. Cloud components 410 may alternatively be any computing device as described above and may include any type of mobile terminal, fixed terminal, or other device. For example, cloud components 410 may be implemented as a cloud computing system and may feature one or more component devices. It should also be noted that system 400 is not limited to three devices. Users may, for instance, utilize one or more devices to interact with one another, one or more servers, or other components of system 400. It should be noted that, while one or more operations are described herein as being performed by particular components of system 400, those operations may, in some embodiments, be performed by other components of system 400. As an example, while one or more operations are described herein as being performed by components of server 422, those operations may, in some embodiments, be performed by components of cloud components 410. In some embodiments, the various computers and systems described herein may include one or more computing devices that are programmed to perform the described functions. Additionally, or alternatively, multiple users may interact with system 400 and/or one or more components of system 400. For example, in one embodiment, a first user and a second user may interact with system 400 using two different components.

With respect to the components of server 422, user terminal 424, and cloud components 410, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 4, both server 422 and user terminal 424 include a display upon which to display data (e.g., as shown in FIG. 1).

Additionally, as server 422 and user terminal 424 are shown as a touchscreen smartphone and a personal computer, these displays also function as user input interfaces. It should be noted that in some embodiments, the devices may have neither a user input interface nor displays and may instead receive and display content using another device (e.g., a dedicated display device such as a computer screen and/or a dedicated input device such as a remote control, mouse, voice input, etc.). Additionally, the devices in system 400 may run an application (or another suitable program). The application may cause the processors and/or control circuitry to perform operations related to recommending content. It should be noted that, although some embodiments are described herein specifically with respect to artificial intelligence models, other predictive, statistically-based analytical models may be used in lieu of or in addition to artificial intelligence models in other embodiments.

Each of these devices may also include memory in the form of electronic storage. The electronic storage may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

FIG. 4 also includes communication paths 428, 430, and 432. Communication paths 428, 430, and 432 may include the internet, a mobile phone network, a mobile voice or data network (e.g., a 5G or LTE network), a cable network, a public switched telephone network, or other types of communication networks or combinations of communication networks. Communication paths 428, 430, and 432 may separately or together include one or more communications paths, such as a satellite path, a fiber-optic path, a cable path, a path that supports internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

Cloud components 410 may be a database (tabular or graph) configured to store user data for the system. For example, the database may include data that the system has collected about the media assets, metadata, and/or correlations between them through prior interactions, both actively and passively. Alternatively, or additionally, the system may function as a clearinghouse for multiple sources of information about the data, available resources, and/or other content. For example, one or more of cloud components 410 may include a microservice and/or components thereof. In some embodiments, the microservice may be a collection of applications that each collect one or more of the plurality of variables.

Cloud components 410 may include model 402, which may be an artificial intelligence model and/or another artificial intelligence model (as described in FIG. 3). Model 402 may take inputs 404 and provide outputs 406. The inputs may include multiple datasets such as a training dataset and a test dataset. Each of the plurality of datasets (e.g., inputs 404) may include data subsets related to user data, original content, and/or alternative content. In some embodiments, outputs 406 may be fed back to model 402 as inputs to train model 402. For example, the system may receive a first labeled feature input, wherein the first labeled feature input is labeled with a known description (e.g., a known metadata tag requirement, metadata field, content population function, etc.) for the first labeled feature input (e.g., a feature input based on labeled training data). The system may then train the first artificial intelligence model to classify the first labeled feature input with the known description.

In another embodiment, model 402 may update its configurations (e.g., weights, biases, or other parameters) based on the assessment of its prediction (e.g., outputs 406) and reference feedback information (e.g., user indication of accuracy, reference labels, or other information). In another embodiment, where model 402 is a neural network, connection weights may be adjusted to reconcile differences between the neural network's prediction and reference feedback. In a further use case, one or more neurons (or nodes) of the neural network may require that their respective errors be sent backward through the neural network to facilitate the update process (e.g., backpropagation of error). Updates to the connection weights may, for example, be reflective of the magnitude of error propagated backward after a forward pass has been completed. In this way, for example, model 402 may be trained to generate better predictions.

In some embodiments, model 402 may include an artificial neural network. In such embodiments, model 402 may include an input layer and one or more hidden layers. Each neural unit of model 402 may be connected with many other neural units of model 402. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 402 may be self-learning and trained, rather than explicitly programmed, and can perform significantly better in certain areas of problem solving, as compared to traditional computer programs. During training, an output layer of model 402 may correspond to a classification of model 402, and an input known to correspond to that classification may be input into an input layer of model 402 during training. During testing, an input without a known classification may be input into the input layer, and a determined classification may be output.

In some embodiments, model 402 may include multiple layers (e.g., where a signal path traverses from front layers to back layers). In some embodiments, back propagation techniques may be utilized by model 402 where forward stimulation is used to reset weights on the "front" neural units. In some embodiments, stimulation and inhibition for model 402 may be more free-flowing, with connections interacting in a more chaotic and complex fashion. During testing, an output layer of model 402 may indicate whether or not a given input corresponds to a classification of model 402 (e.g., an incident).

For example, in some embodiments, the system may train an artificial intelligence model (e.g., an artificial neural network) to detect known descriptions based on a feature input. For example, the system may receive user data (e.g., comprising the variables and categories of variables described herein). The system may then generate a series of feature inputs based on the training data. For example, the system may generate a first feature input based on training data comprising user data corresponding to a first known error (or error likelihood). The system may label the first feature input with the first known description (e.g., labeling the data as corresponding to a classification of the description).

For example, in some embodiments, the system may train an artificial intelligence model (e.g., an artificial neural network) to determine a known metadata tag requirement, metadata field, content population function, etc. For example, the system may receive a criterion (e.g., a known metadata tag requirement, metadata field, content population function, etc.). The system may then generate a series of feature inputs based on the criterion. For example, the system may generate a feature input based on training data comprising content corresponding to the model's interpretation of the user's description, and the system may determine a response (e.g., a known metadata tag requirement, metadata field, content population function, etc.).

The system may then train an artificial intelligence model to detect the first known content based on the labeled first feature input. The system may also train an artificial intelligence model (e.g., the same or different artificial intelligence model) to detect a second known content based on a labeled second feature input. For example, the training process may involve initializing some random values for each of the training matrices (e.g., of an artificial intelligence model) and attempting to predict the output of the input feature using the initial random values. Initially, the error of the model will be large, but by comparing the model's prediction with the correct output (e.g., the known classification), the model is able to adjust the weights and biases values until the model provides the required predictions.

In some embodiments, the system may use one or more modeling approaches, including supervised modeling. Such supervised machine learning approaches such as linear or nonlinear regression, including neural networks and support vector machines, could be exploited to predict these processing requirements, should sufficient amounts of training data be available. In particular, processing requirement data can be sequential, time-dependent data, and this means that Recurrent Neural Networks (RNNs), CNN, and/or transformers, specifically, may be highly applicable in this setting for accurate price forecasting. In some embodiments, the system may use a model involving time series prediction and use Random Forest algorithms, Bayesian RNNs, LSTMs, transformer based models, CNNs or other methods, or combinations of two or more of these and the following: Neural Ordinary Differential Equations (NODEs), stiff and non-stiff universal ordinary differential equations (universal ODEs), universal stochastic differential equations (universal SDEs), and/or universal delay differential equations (universal DDEs).

In some embodiments, the system may use a model that comprises generative artificial intelligence. Generative artificial intelligence is a type of artificial intelligence technology that can produce various types of content, including text, imagery, audio and synthetic data. Additionally or alternatively, the system may use LLM of small language models (SLM). For example, a LLM is a type of artificial intelligence algorithm that uses deep learning techniques and massively large data sets to understand, summarize, generate and/or predict new content. The system may also use a SLM where training the smaller models consumes less energy and costs less by shifting the knowledge memorized by the model from the parameters into an external database, which not only reduces the number of necessary parameters, but also makes the model's knowledge easier to update. For example, instead of retraining the model, the system may simply extend the document database by feeding new data to the models and storing the resulting document embeddings.

The system may receive user data via a microservice and/or other means. For example, the microservice may comprise a collection of applications that each collect one or more of a plurality of variables. For example, the system may extract user data from an API layer operating on a user device or at a service provider (e.g., via a cloud service accessed by a user). Additionally or alternatively, the system may receive user data files (e.g., as a download and/or streaming in real time or near real time).

System 400 also includes API layer 450. For example, in some embodiments, the system may be implemented as one or more APIs and/or an API layer. In some embodiments, API layer 450 may be implemented on server 422 or user terminal 424. Alternatively or additionally, API layer 450 may reside on one or more of cloud components 410. API layer 450 (which may be a REST or Web services API layer) may provide a decoupled interface to data and/or functionality of one or more applications. API layer 450 may provide a common, language-agnostic way of interacting with an application. Web services APIs offer a well-defined contract, called WSDL, that describes the services in terms of their operations and the data types used to exchange information. REST APIs do not typically have this contract; instead, they are documented with client libraries for most common languages including Ruby, Java, PHP, and JavaScript. SOAP Web services have traditionally been adopted in the enterprise for publishing internal services as well as for exchanging information with partners in B2B transactions.

API layer 450 may use various architectural arrangements. For example, system 400 may be partially based on API layer 450, such that there is strong adoption of SOAP and RESTful Web services, using resources like Service Repository and Developer Portal but with low governance, standardization, and separation of concerns. Alternatively, system 400 may be fully based on API layer 450, such that separation of concerns between layers like API layer 450, services, and applications are in place.

In some embodiments, the system architecture may use a microservice approach. Such systems may use two types of layers: Front-End Layer and Back-End Layer where microservices reside. In this kind of architecture, the role of the API layer 450 may provide integration between Front-End and Back-End. In such cases, API layer 450 may use RESTful APIs (exposition to front-end or even communication between microservices). API layer 450 may use AMQP (e.g., Kafka, RabbitMQ, etc.). API layer 450 may use incipient usage of new communications protocols such as gRPC, Thrift, etc.

In some embodiments, the system architecture may use an open API approach. In such cases, API layer 450 may use commercial or open source API Platforms and their modules. API layer 450 may use a developer portal. API layer 450 may use strong security constraints applying WAF and DDoS protection, and API layer 450 may use RESTful APIs as standard for external integration.

Figure 5:
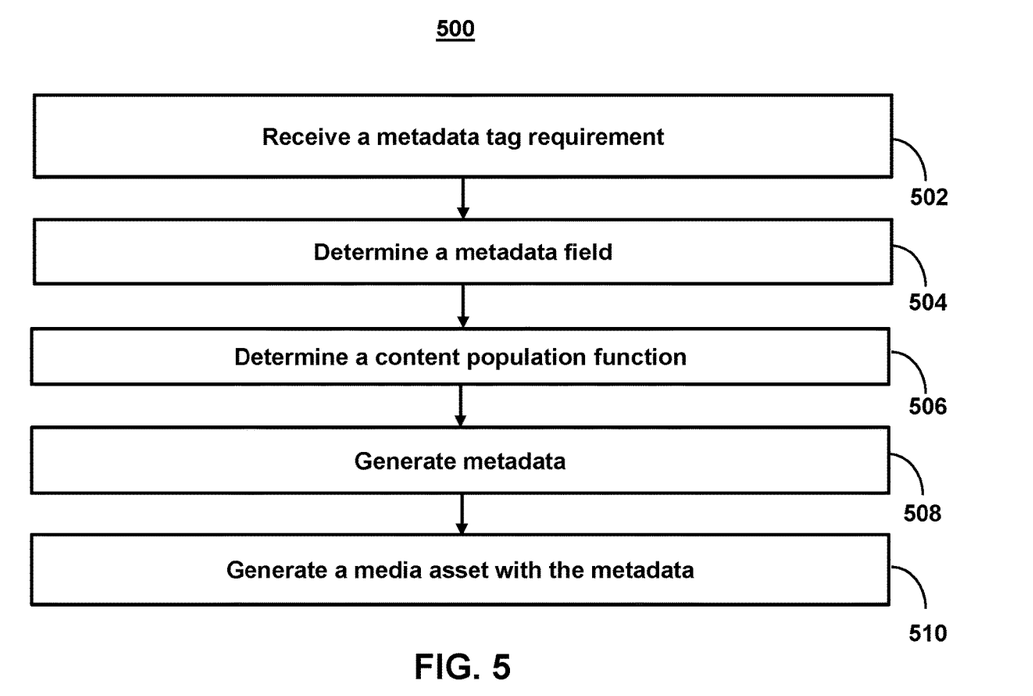
FIG. 5 shows a flowchart for steps involved in dynamically updated metadata, in accordance with one or more embodiments.

FIG. 5 shows a flowchart of the steps involved in generating dynamically updated metadata using real-time artificial intelligence models, in accordance with one or more embodiments. For example, the system may use process 500 (e.g., as implemented on one or more system components described above) in order to generate dynamically updated metadata using real-time artificial intelligence models (e.g., meta tags).

At step 502, process 500 (e.g., using one or more components described above) receives a first metadata tag requirement for first metadata of a first media asset. For example, the system may receive a first metadata tag requirement for first metadata of a first media asset. For example, the system may receive a first metadata tag requirement for first metadata of a first media asset, wherein the first metadata tag requirement indicates usage rights of the first media asset (e.g., the meta tag is used to indicate the usage rights of a digital asset and/or specifies the terms and/or conditions for using the media asset, such as whether it can be used for commercial purposes, modified, or distributed). In another example, the metadata tag may identify information about the artificial intelligence technology used in the digital asset, which could include the type of artificial intelligence technology, the specific algorithm used, and/or other relevant information.

In some embodiments, the system may select a metadata tag requirement based on a type of content. For example, the system may determine a first type of the first media asset. The system may then determine the first metadata tag requirement based on the first type. For example, the system may use taxonomies or controlled vocabularies, which are predefined and standardized sets of terms and categories of metadata tag requirements for given media assets. Metadata tag requirements may be tagged and/or classified using these taxonomies, ensuring consistency, and facilitating metadata tag requirement selection for types of media assets. Taxonomies may include hierarchies, relationships between terms, and rules for their application. In some embodiments, the type may be manually determined. For example, content creators, curators, or administrators manually assign or input metadata tag requirements based on their understanding of the media asset and its context. Alternatively or additionally, the system may use automated processes that can analyze the content of the media asset to extract relevant keywords, data, and/or concepts. For example, NLP algorithms can identify significant terms, entities, or phrases and suggest metadata based on their frequency, relevance, or semantic meaning. Additionally or alternatively, the system may use advanced techniques, such as machine learning algorithms, and can analyze large datasets to identify patterns and correlations between content and metadata. These algorithms can learn from existing metadata associations and make predictions or recommendations for selecting appropriate metadata tag requirements for new media assets.

At step 504, process 500 (e.g., using one or more components described above) determines a metadata field. For example, the system may determine a first metadata field for the first metadata based on the first metadata tag requirement. For example, the system may determine a first metadata field of a plurality of metadata fields for the first metadata based on the first metadata tag requirement. For example, in the usage rights embodiments, the metadata field may include: <meta name="Usage Rights" content="Creative Commons">. In the artificial intelligence example above, the system may select a name for the meta tag that reflects the type of artificial intelligence technology used (e.g., "Ⓐ"). The system may then define a content attribute for the meta tag that specifies a value associated with the meta tag. For example, the system may select a value for the meta tag that reflects a specific algorithm used in the artificial intelligence technology, or a more general term like "machine learning."

In some embodiments, the system determining the first metadata field for the first metadata based on the first metadata tag requirement may comprise the system determining a second type of the first metadata tag requirement and determining the first metadata field based on the second type. For example, the system may select a metadata field based on a type of metadata tag requirement. For example, the system may use taxonomies or controlled vocabularies, which are predefined and standardized sets of terms and categories of metadata field based on a type of metadata tag requirement. Metadata fields may be tagged and/or classified using these taxonomies, ensuring consistency, and facilitating metadata tag requirement selection for types of metadata tag requirements. Taxonomies may include hierarchies, relationships between terms, and rules for their application. In some embodiments, the type may be manually determined. For example, content creators, curators, or administrators manually assign or input metadata fields based on their understanding of the metadata tag requirement and its context. Alternatively or additionally, the system may use automated processes that can analyze the content of the metadata tag requirement to extract relevant keywords, data, and/or concepts. For example, NLP algorithms can identify significant terms, entities, or phrases and suggest metadata fields based on their frequency, relevance, or semantic meaning. Additionally or alternatively, the system may use advanced techniques, such as machine learning algorithms, and can analyze large datasets to identify patterns and correlations between metadata tag requirements and metadata fields. These algorithms can learn from existing metadata field and metadata tag requirement associations and make predictions or recommendations for selecting appropriate new metadata field and metadata tag requirement associations.

At step 506, process 500 (e.g., using one or more components described above) determines a content population function. For example, the system may determine a first content population function for the first metadata field. For example, the system may determine a first content population function for the first metadata field, wherein the first content population function comprises a self-contained block of code that performs a usage rights verification task.

In some embodiments, the first content population function may comprise a function the receives inputs of a specific type of content and outputs a different type of content. For example, the content population function may be used to update and/or modify the content in one or more metadata fields. For example, the content population function may provide content for the fields for the meta tag. The content population function may fill (e.g., by an artificial intelligence model) the metadata field with content that may not be present upon creating the media asset (e.g., similar and/or different images, similar text, similar audio, usage, location of use, use in other applications such as using a photo to create a new one by another with an artificial intelligence model). To generate this content, the content population function may indicate a particular input type and output type. For example, the system may determine an input type for the first content population function. The system may then determine an output type for the first content population function.

At step 508, process 500 (e.g., using one or more components described above) generates the metadata. For example, the system may generate the first metadata with the first content population function. For example, the system may generate the first metadata with the first content population function, wherein the first metadata indicates first usage rights attributed to the first media asset. For example, in the artificial intelligence example above, the meta tag may be insert edit into the HTML code (e.g., <meta name="Ⓐ" content="Machine Learning">) for the media asset, which ensures that the information is embedded in the asset and may be accessed by (or may itself access) search engines, digital asset management systems, and/or other tools. In some embodiments, the system may populate the relevant metadata fields based on predefined rules and templates, such as the "Ⓐ" field and the "license terms" field. The system could also generate a unique identifier for the artificial intelligence model and associate it with the metadata. By including ownership and licensing information in a meta tag, digital asset managers and other users can quickly and easily understand the intellectual property rights associated with an artificial intelligence model and/or media asset and ensure that they are using the asset in compliance with relevant laws and regulations.

In some embodiments, the first content population function may comprise a function that uses a specific algorithm for generating metadata. For example, the content population function may be used to update and/or modify the content in one or more metadata fields and/or generate new metadata using the algorithm. For example, determining the first content population function may comprise the system determining an algorithm for the first content population function and determining the first metadata for the first media asset using the algorithm. For example, the content population function may use one or more algorithms and techniques to generate content, depending on the specific task and requirements. For example, the content population function may comprise rule-based algorithms. These algorithms use predefined rules and patterns to generate content. They often rely on templates, placeholders, and specific grammatical rules to create structured content. Additionally or alternatively, the content population function may comprise Markov chains algorithms. Markov chains are probabilistic models that generate content based on the probability of transitioning from one state to another. They can be trained on existing data to learn patterns and generate new sequences of text. Additionally or alternatively, the content population function may comprise RNNs' algorithms. RNNs are a type of deep learning algorithm commonly used for generating sequential data. They have a "memory" that allows them to capture context and generate coherent content. Variants of RNNs, such as Long Short-Term Memory (LSTM) and Gated Recurrent Units (GRUs), are often used for text generation tasks. Additionally or alternatively, the content population function may comprise Generative Adversarial Networks (GANs). GANs consist of two neural networks—a generator and a discriminator—that compete against each other. The generator network learns to generate content (e.g., images, text) that resembles the training data, while the discriminator network tries to distinguish between real and generated content. GANs have been successfully used for various content generation tasks. Additionally or alternatively, the content population function may comprise transformer models. Transformer models, such as OpenAI's GPT (Generative Pre-trained Transformer) series, are based on self-attention mechanisms and have achieved significant advancements in NLP tasks, including content generation. These models learn from large amounts of text data and generate coherent and contextually relevant content. Additionally or alternatively, the content population function may comprise Variational Autoencoders (VAEs). VAEs are generative models that learn a low-dimensional representation of input data. They can be used to generate new content by sampling from the learned latent space and decoding it back into the original data domain.

In some embodiments, the content population function may search for content that may be used to update metadata for the media asset. For example, the system can continuously and/or periodically query one or more high-level, public artificial intelligence systems, databases, and/or the internet to request updates to the metadata underlying the media asset. The system may search for content of a particular type. For example, generating the first metadata with the first content population function may comprise the system determining a content type for the first content population function and populating the first metadata with the content type.

For example, the meta tags may comprise a function that extracts relevant data from the synchronized rights and then maps it to the appropriate metadata fields. In some embodiments, the system may identify relevant documents, extract relevant information, populate metadata fields, verify current content, update content, and/or create a unique identifier Ⓐ for the relevant metadata fields.

In some embodiments, the content population function may search for content that may be used to update metadata for the media asset. For example, the system can continuously query one or more high-level, public artificial intelligence systems, databases, and/or the internet to request updates to the metadata underlying the media asset. For example, a media asset can be expanded in definition to a NFT or a digital token representing a physical asset, whereby the meta tag describes the underlying physical asset and can change the description over time depending on market value of such asset, attributes of such asset that are known publicly, etc. For example, a meta tag on a digital token representing a car could change based on mileage of the car, valuation of the car, price of the car in major selling platforms, reputation of the car, etc. For example, generating the first metadata with the first content population function may comprise the system determining a search criterion for the first content population function and performing a search based on the search criterion.

In some embodiments, the content population function may update metadata for the media asset based on a given operation frequency. For example, the system may perform operations at a given frequency through the use of a clock signal. The clock signal provides a timing mechanism that synchronizes the operations of various components within the computer system. The system may also use other factors such as the efficiency of the processor architecture, cache sizes, memory speed, and/or software optimization to determine when to perform the content population function. For example, generating the first metadata with the first content population function may comprise the system determining an operation frequency for the first content population function and performing the first content population function based on the operation frequency.

In some embodiments, the content population function may update metadata for the media asset using specific data sources. For example, the system can continuously and/or periodically query one or more high-level, public artificial intelligence systems, databases, and/or the internet to request updates to the metadata underlying the media asset. For example, generating the first metadata with the first content population function may comprise the system determining a data source for the first content population function and determining the first metadata for the first media asset based on the data source.

In some embodiments, the system may parse a data source (e.g., a database, web site, the internet, etc.). For example, the system may establish a connection either directly or through a network. This connection may be facilitated by an Internet Service Provider (ISP) or a local network. After establishing a connection, the system may use protocols such as Hypertext Transfer Protocol (HTTP) to send requests to web servers. These requests specify the desired information, such as web pages, images, videos, or other resources. Web servers receive the requests and respond by sending back the requested web pages. The server's response typically includes the requested content, along with metadata and other relevant information. The received web pages may be written in Hypertext Markup Language (HTML), a language used for structuring the content on the web. The system may use a computer's web browser or specialized web-crawling software to parse the HTML code to understand the structure and retrieve relevant data. The parsed HTML may be converted into a Document Object Model (DOM), which represents the structure of the web page as a tree-like data structure. This model allows the computer to access and manipulate the various elements of the web page, such as headings, paragraphs, images, links, and more. When parsing web pages, the system may encounter links to other pages or resources. To navigate the internet effectively, computers follow these links, repeat the process of sending requests, retrieve web pages, and parse the content recursively. For example, generating the first metadata with the first content population function may comprise the system parsing a data source using the first content population function and determining the first metadata for the first media asset based on parsing the data source.

In some embodiments, the system may extract data from a third-party data source. To extract data, the system may use automatic metadata extraction. For example, the system may use text analysis. Text analysis involves analyzing the content of a file to extract metadata. For example, you can use NLP algorithms to analyze the text of a document and extract keywords, topics, and named entities. This information can be used to automatically generate metadata tags for the file. Additionally or alternatively, the system may use image analysis. Image analysis involves analyzing the visual content of an image to extract metadata. For example, the system can use computer vision algorithms to identify objects, scenes, and other visual features in an image, which can be used to automatically generate metadata tags for the image. Additionally or alternatively, the system may use audio and video analysis. Audio and video analysis involves analyzing the audio and visual content of a file to extract metadata. For example, the system can use speech recognition algorithms to transcribe the audio content of a video or audio file, which can be used to automatically generate metadata tags for the file. For example, generating the first metadata with the first content population function may comprise the system automatically extracting third-party data from a data source using the first content population function determining the first metadata for the first media asset based on the third-party data.

In some embodiments, the system may generate the metadata for a given metadata tag name. For example, the metadata tag name is used to indicate the type of artificial intelligence technology used in a media asset. The metadata tag name may specify the underlying technology or algorithm that was used to create or analyze the asset, which can provide valuable information for developers and researchers. For example, generating the first metadata with the first content population function may comprise the system determining an algorithm used by the first content population function and determining a metadata tag name based on the algorithm.

At step 510, process 500 (e.g., using one or more components described above) generates a media asset with the metadata. For example, the system may generate the first media asset with the first metadata (e.g., a meta tag). In some embodiments, the system may reflect changes in the underlying media asset as well as its relationship to other media assets. For example, the metadata may provide a probability/confidence level of how accurate the metadata is, whether or not the media asset is similar to other media assets (and/or to what degree), and/or describe how (and/or by whom) the media asset has been used. Moreover, the solution overcomes the issues discussed above related to metadata and does not invoke the technical problems attributed to blockchain technology.

In some embodiments, the system may continuously or periodically update the metadata of the media asset. For example, the system may generate second metadata with the first content population function. The system may then update the first media asset with the second metadata. For example, the system may, subsequent to generating the first media asset with the first metadata, generate second metadata with the first content population function, wherein the second metadata indicates second usage rights attributed to the first media asset. The system may then update the first media asset with the second metadata.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 5.

Figure 6:
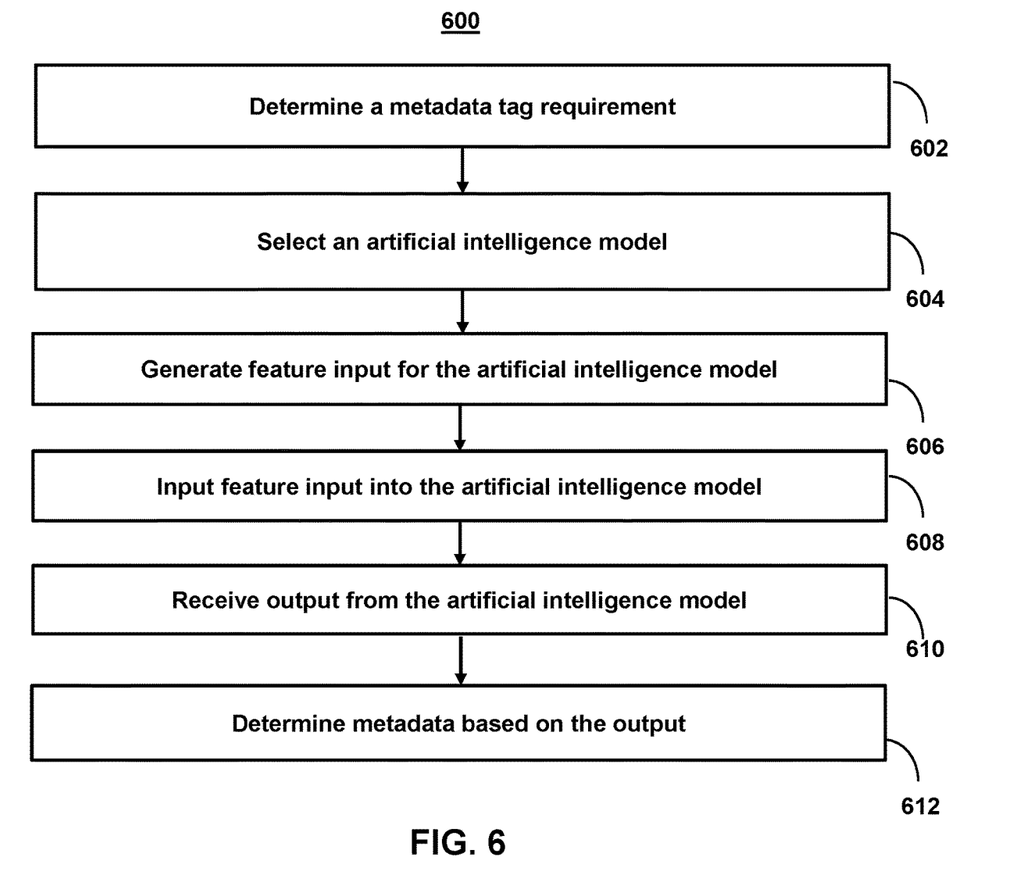
FIG. 6 shows a flowchart for using an artificial intelligence model for generating dynamically updated metadata, in accordance with one or more embodiments.

FIG. 6 shows a flowchart for using an artificial intelligence model for generating dynamically updated metadata, in accordance with one or more embodiments. For example, the system may use specific algorithms and artificial intelligence models that are designed to allow for automatic/systematic optimization of generating dynamically updated metadata. For example, the system may use process 600 (e.g., as implemented on one or more system components described above) in order to generate dynamically updated metadata using real-time artificial intelligence models (e.g., a meta tag).

At step 602, process 600 (e.g., using one or more components described in FIG. 4) determines a metadata tag requirement. For example, the system may receive a request for dynamically updated metadata. The request may further specify a metadata tag requirement for the dynamically updated metadata.

At step 604, process 600 (e.g., using one or more components described in FIG. 4) selects an artificial intelligence model based on the metadata tag requirement. For example, the system may select an artificial intelligence model from a plurality of artificial intelligence models (e.g., the plurality of artificial intelligence models described in FIG. 3). The artificial intelligence models may use Bayesian classifiers, decision tree learners, decision rule classifiers, neural networks, and/or nearest neighbor algorithms.

At step 606, process 600 (e.g., using one or more components described in FIG. 4) generates feature input for the selected artificial intelligence model. For example, the system may generate a feature input with a format and/or values that are normalized based on the model into which the feature input is to be input. For example, in some embodiments, the system may use a latent representation (e.g., as described in FIG. 3), in which a lower dimensional representation of data may be used.

At step 608, process 600 (e.g., using one or more components described in FIG. 4) inputs the feature input into the artificial intelligence model. For example, the system may input a feature input into the artificial intelligence model. For example, the system may generate dynamically updated metadata for a media asset by generating a first feature input for the artificial intelligence model and inputting the input into the artificial intelligence model.

At step 610, process 600 (e.g., using one or more components described in FIG. 4) receives output. For example, the system may receive an output from the artificial intelligence model. For example, the output may indicate a determination used to generate the metadata and/or create a new meta tag. For example, each determination may comprise a determination of content for a metadata field that may be based on one or more outputs from the artificial intelligence model.

At step 612, process 600 (e.g., using one or more components described in FIG. 4) determines metadata for a media asset based on the output. For example, the system may determine content for one or more metadata fields based on the output from the artificial intelligence model.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-5 could be used to perform one or more of the steps in FIG. 6.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for generating dynamically updated metadata using real-time artificial intelligence models.
2. The method of the preceding embodiment, further comprising: receiving a first metadata tag requirement for first metadata of a first media asset; determining a first metadata field for the first metadata based on the first metadata tag requirement; determining a first content population function for the first metadata field; generating the first metadata with the first content population function; and generating the first media asset with the first metadata.
3. The method of any one of the preceding embodiments, wherein receiving the first metadata tag requirement for first metadata of the first media asset further comprises: determining a first type of the first media asset; and determining the first metadata tag requirement based on the first type.
4. The method of any one of the preceding embodiments, wherein determining the first metadata field for the first metadata based on the first metadata tag requirement further comprises: determining a second type of the first metadata tag requirement; and determining the first metadata field based on the second type.
5. The method of any one of the preceding embodiments, wherein determining the first content population function for the first metadata field further comprises: determining an input type for the first content population function; and determining an output type for the first content population function.
6. The method of any one of the preceding embodiments, wherein generating the first metadata with the first content population function further comprises: determining an algorithm for the first content population function; and determining the first metadata for the first media asset using the algorithm.
7. The method of any one of the preceding embodiments, wherein generating the first metadata with the first content population function further comprises: determining a content type for the first content population function; and populating the first metadata with the content type.
8. The method of any one of the preceding embodiments, wherein generating the first metadata with the first content population function further comprises: determining a search criterion for the first content population function; and performing a search based on the search criterion.

9. The method of any one of the preceding embodiments, wherein generating the first metadata with the first content population function further comprises: determining an operation frequency for the first content population function; and performing the first content population function based on the operation frequency.

10. The method of any one of the preceding embodiments, wherein generating the first metadata with the first content population function further comprises: determining a data source for the first content population function; and determining the first metadata for the first media asset based on the data source.

11. The method of any one of the preceding embodiments, wherein generating the first metadata with the first content population function further comprises: parsing a data source using the first content population function; and determining the first metadata for the first media asset based on parsing the data source.

12. The method of any one of the preceding embodiments, wherein generating the first metadata with the first content population function further comprises: automatically extracting third-party data from a data source using the first content population function; and determining the first metadata for the first media asset based on the third-party data.

13. The method of any one of the preceding embodiments, wherein generating the first metadata with the first content population function further comprises: determining an algorithm used by the first content population function; and determining a metadata tag name based on the algorithm.

14. The method of any one of the preceding embodiments, further comprising: generating second metadata with the first content population function; and updating the first media asset with the second metadata.

15. One or more non-transitory, computer-readable media storing instructions that, when executed by a data processing apparatus, cause the data processing apparatus to perform operations comprising those of any of embodiments 1-14.

16. A system comprising one or more processors; and memory storing instructions that, when executed by the processors, cause the processors to effectuate operations comprising those of any of embodiments 1-14.

17. A system comprising means for performing any of embodiments 1-14.

What is claimed is:

1. One or more non-transitory, computer-readable mediums comprising instructions that when executed by one or more processors cause operations comprising:
    receiving a first metadata requirement for first metadata of a first media asset;
    determining a first metadata field of a plurality of metadata fields for the first metadata based on the first metadata requirement;
    determining a first content population function for the first metadata field, wherein the first content population function comprises a self-contained block of code that performs a verification task;
    generating the first metadata with the first content population function, wherein the first metadata indicates first information attributed to the first media asset;
    generating the first media asset with the first metadata;
    subsequent to generating the first media asset with the first metadata, generating second metadata with the first content population function, wherein the second metadata indicates second information attributed to the first media asset; and
    updating the first media asset with the second metadata.

2. A method for generating dynamically updated metadata using real-time artificial intelligence models, the method comprising:
    receiving a first metadata requirement for first metadata of a first media asset;
    determining a first metadata field for the first metadata based on the first metadata requirement;
    determining a first content population function for the first metadata field, wherein the first content population function comprises a self-contained block of code that performs a verification task;
    generating the first metadata with the first content population function, wherein the first metadata indicates first information attributed to the first media asset;
    generating the first media asset with the first metadata;
    subsequent to generating the first media asset with the first metadata, generating second metadata with the first content population function, wherein the second metadata indicates second information attributed to the first media asset; and
    updating the first media asset with the second metadata.

3. The method of claim 2, further comprising:
receiving third metadata of a second media asset; and
using the third metadata and the first content population function to generate the first metadata.

4. The method of claim 2, further comprising:
receiving user-generated metadata; and
using the user-generated metadata and the first content population function to generate the first metadata.

5. The method of claim 2, further comprising:
receiving user profile data; and
using the user profile data and the first content population function to generate the first metadata.

6. The method of claim 2, further comprising:
receiving third metadata, wherein the third metadata comprises a probability or confidence related to the second metadata; and
using the third metadata and the first content population function to generate the second metadata.

7. The method of claim 2, further comprising:
receiving third metadata, wherein the third metadata comprises a condition used to provide a search function; and
using the third metadata and the first content population function to generate the second metadata.

8. The method of claim 2, further comprising:
receiving third metadata, wherein the third metadata comprises an update period for the first content population function; and
using the third metadata and the first content population function to generate the second metadata.

9. The method of claim 2, further comprising:
receiving third metadata, wherein the third metadata comprises an artificial intelligence model determination for the first content population function; and
using the artificial intelligence model to generate the second metadata.

10. The method of claim 2, further comprising:
receiving third metadata, wherein the third metadata comprises a communication path for the first content population function; and
using the communication path to update the first media asset.

11. The method of claim 2, further comprising:
receiving a second metadata requirement for third metadata of a second media asset;
determining a second metadata field for the third metadata based on the second metadata requirement;
determining a second content population function for the second metadata field, wherein second content population function generates metadata based on metadata updates to the first media asset;
generating the third metadata with the second content population function;
generating the second media asset with the third metadata;
subsequent to generating the second media asset with the third metadata, generating fourth metadata with the second content population function based on updating the first media asset with the second metadata; and
updating the second media asset with the fourth metadata.

12. The method of claim 2, wherein receiving the first metadata requirement for the first metadata of the first media asset further comprises:
determining a first type of the first media asset; and
determining the first metadata requirement based on the first type.

13. The method of claim 2, wherein determining the first content population function for the first metadata field further comprises:
determining an input type for the first content population function; and
determining an output type for the first content population function.

14. The method of claim 2, wherein generating the first metadata with the first content population function further comprises:
determining an algorithm for the first content population function; and
determining the first metadata for the first media asset using the algorithm.

15. The method of claim 2, wherein generating the first metadata with the first content population function further comprises:
determining a content type for the first content population function; and
populating the first metadata with the content type.

16. The method of claim 2, wherein generating the first metadata with the first content population function further comprises:
determining a search criterion for the first content population function; and
performing a search based on the search criterion.

17. The method of claim 2, wherein generating the first metadata with the first content population function further comprises:
determining an operation frequency for the first content population function; and
performing the first content population function based on the operation frequency.

18. The method of claim 2, wherein generating the first metadata with the first content population function further comprises:
determining a data source for the first content population function; and
determining the first metadata for the first media asset based on the data source.

19. The method of claim 2, wherein generating the first metadata with the first content population function further comprises:
parsing a data source using the first content population function; and
determining the first metadata for the first media asset based on parsing the data source.

20. The method of claim 2, wherein generating the first metadata with the first content population function further comprises:
automatically extracting third-party data from a data source using the first content population function; and
determining the first metadata for the first media asset based on the third-party data.

* * * * *